United States Patent [19]

Rocky

[11] Patent Number: 4,883,040
[45] Date of Patent: Nov. 28, 1989

[54] FUEL VAPORIZER

[76] Inventor: William C. Rocky, 3242 Lennard St., Ft. Pierce, Fla. 34984

[21] Appl. No.: 152,818

[22] Filed: Feb. 5, 1988

[51] Int. Cl.$^4$ .................. F02M 31/00; F02M 31/08; F02M 31/10
[52] U.S. Cl. .................................. 123/557; 123/545
[58] Field of Search .................. 123/557, 543, 545

[56] References Cited

U.S. PATENT DOCUMENTS

| | | | |
|---|---|---|---|
| 3,472,214 | 10/1969 | Moon | 123/557 |
| 3,931,801 | 1/1976 | Rose et al. | 123/557 |
| 4,180,036 | 12/1979 | Wolf | 123/557 |
| 4,491,119 | 1/1985 | Fefeu | 123/557 |
| 4,510,912 | 4/1985 | Gamble | 123/557 |

Primary Examiner—Willis R. Wolfe
Assistant Examiner—M. Macy
Attorney, Agent, or Firm—Malin, Haley & McHale

[57] ABSTRACT

The invention relates to a method and system for increasing the output in terms of miles per gallon attainable by a conventional internal combustion engine. The improvement in m.p.g. is the result of a fuel vaporizer unit which utilizes engine collant and exhaust gases in heat exchange relationship to vaporize raw fuel. The gas vapors are collected within the vaporizer unit and then directed to the carburetor wherein it is united with air prior to entering the intake manifold. It has been found that running an engine on a mixture of gas vapors and air produces significantly improved mileage over that otherwise attainable. An additional advantage of the vaporizer unit is the resulting reduction of the amount of pollutants released into the atmosphere due to the complete and total combustion of all the vapors entering the combustion chambers.

9 Claims, 2 Drawing Sheets

FUEL VAPORIZER

BACKGROUND OF THE INVENTION

Ever since the invention of the automobile, man has been attempting to find ways to improve the performance of the internal combustion engine. In the early days of the automobile, when autos were few in number, the novelty of the automobile and its ability to improve the mobility of the nation, far exceeded any concern over the efficiency of the internal combusion engine.

With the passage of time, the number of automobiles has increased beyond the wildest dreams of the early pioneers. In addition to the vast increase in the number of automobiles, there has been increased concern over the amount of pollutants being put into the atmosphere by the exhaust of the engines. Further, during the last decade the nation has experienced two national crises resulting from foreign oil embargoes.

As result of these three factors, activity concerning the improvement of gas mileage and reduction of harmful pollutants has risen significantly. Various means have been designed and are in use, whereby a portion of the exhaust gases are recirculated back into the combustion chambers to reduce the amount of harmful pollutants being released into the atmosphere. Additionally, all new automobiles are equipped with catalytic converters which serve to reduce harmful emissions from the engine.

In addition to treating the exhaust gases, there have been a plethora of devices or attachments which are designed to treat the gasoline in some fashion before it enters the carburetor of the engine. Many of these devices are directed toward the atomization of the fuel prior to its entering the combustion chamber. The theory behind such devices is that by breaking up the fuel into minute particles, there is a more complete burning of the fuel supplied to the cylinders resulting in increased miles per gallon (m.p.g.) and also less pollution in the engine exhaust. This last mentioned approach is the reason for the recent rise in fuel injected engines, both mechanical and electronic.

Additionally, there has also been an increase in the number of engines equipped with pre-heaters. Pre-heaters are utilized in some instances to preheat the air, fuel, or, as in some instances, both fuel and air. By preheating the air and fuel prior to entering the combustion chambers, there is an increase in the molecular activity of the fuel and air resulting in a better mixing of these components resulting in more complete combustion and reduced pollution.

SUMMARY OF THE INVENTION

The instant invention provides a method and apparatus for improving the mileage attainable by an internal combustion engine while simultaneously permitting more complete combustion of the fuel than heretofore attainable thus significantly reducing the pollutants discharged into the atmosphere.

The invention accomplishes this by means of a unique closed fuel system wherein the raw fuel is directed to a fuel vaporizer unit that is in heat exchange relationship with the engine coolant water to vaporize to raw fuel. A portion of the hot exhaust gases is also directed into the fuel vaporizer to add additional heat and increase vaporization of the fuel. The fuel vapors are collected in the upper portion of the fuel vaporizer then directed by appropriate tubing to the carburetor and then to the intake manifold and combustion chambers. Significant features of this system are:

1. The fact that the engine is running on FUEL VAPORS only, thus there is total combustion of the fuel; and
2. As a result of this complete combustion, the amount of pollution released with the exhaust gases is significantly reduced.

OBJECTS OF THE INVENTION

An object of the invention is to provide a fuel system for an internal combustion engine wherein the miles per gallon is significantly improved over conventional fuel systems.

A further object of the invention is the provision of a fuel system which provides reduced pollutants in the exhaust gases.

Yet another object of the invention is the provision of an internal combustion fuel system which is economical and easy to adapt to conventional automotive fuel systems.

A still further object of the invention is the provision of a fuel vaporizer wherein the engine is operated exclusively on a mixture of fuel vapors, air and a portion of recycled exhaust gases.

Yet another object of the invention is the provision of a fuel vaporizer wherein raw fuel is heated to produce vapors.

Another object of the invention is to provide a fuel system that can be readily changed from a conventional system to the fuel saving mode.

A further object of the invention is the provision of a fuel vaporizer wherein raw fuel is brought into heat exchange relationship with hot engine coolant and hot exhaust gases.

These and other objects of the instant invention will become more apparent hereinafter. The instant invention will now be described with particular reference to the accompanying drawings which form a part of this specification wherein like reference characters designate corresponding parts in the several views.

DETAILED DESCRIPTION OF THE DRAWINGS

Figure 1:
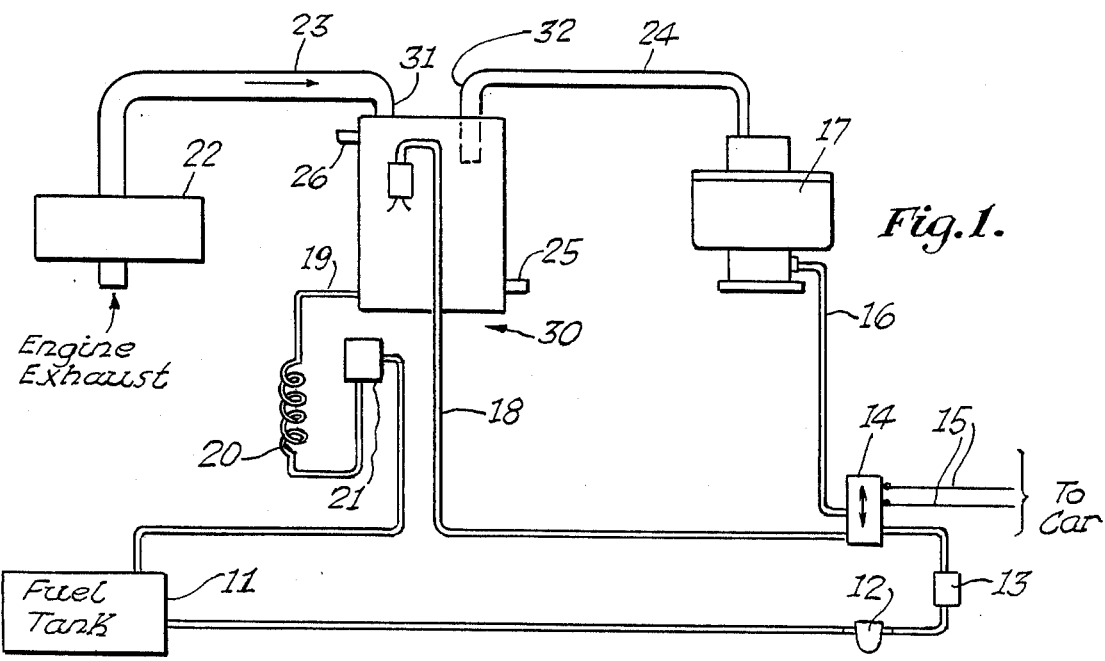
FIG. 1 is a diagrammatic view of the novel fuel system illustrating the relationship of the various components.

FIG. 1 is a diagrammatic illustration of the manner in which fuel vaporizer unit 20 is interconnected with the remaining components of an engine's fuel system. Fuel is drawn from fuel tank 10 through fuel line 11 by means of fuel pump 12. As the fuel leaves fuel pump 12 it passes through a conventional fuel filter 13. On the downstream side of fuel filter 13 is a solenoid operated fuel selector valve 14. Electrical leads 15 continue back into the drivers compartment of the vehicle and are attached to a selector switch (not shown). One position of the solenoid fuel selector directs the fuel via line 16 directly into the carburetor 17 in the usual manner. The purpose of fuel selector valve 14 will be discussed in greater detail later. When fuel selector valve 14 is in the other position, fuel is directed via line 18 into fuel vaplorizer 30 wherein the fuel is released through nozzle spray head 35. Overflow line 19 is provided to remove excess fuel from concentric chamber 50 and passes the fuel through cooling coil 20 via electric pump 21 and then back into fuel tank 10. Exhaust gases are tapped from PCV valve 22 and directed via line 23 into the center of fuel vaporizer unit 30 via tubing 31. Gas vapors produced in fuel vaporizer unit 30 are released through fitting 32 and conducted via vapor line 24 to the carburetor 17. Fuel vaporizer unit 30 is also provided with an inlet 25 for hot engine coolant water and outlet 26 for returning the water to the engine coolant system (not shown).

We will now discuss the purpose of solenoid operated fuel selector valve 14. Initially, in cold starting the engine, fuel selector valve 14 is flipped to the "START" position by the driver of the vehicle. When selector valve 14 is in the "START" position, fuel is directed through line 16 and into carburetor 17 in the same manner as if the engine were not equipped with a fuel vaporizer unit. The reason is the fact that fuel vaporizer unit 30 requires a source of heat to bring about vaporization of the fuel. When the engine is first started, the engine's cooling water is not sufficiently hot enough to transfer any heat to the fuel. However, after the engine has been running a short period of time and the engine cooling water has reached 190° F. the driver merely flips a switch to "RUN" in the vehicle to move solenoid fuel selector valve 14 to its other position. When fuel selector valve is in its "RUN" position, fuel is then directed via line 18 to fuel vaporizer unit 30.

Figure 2:
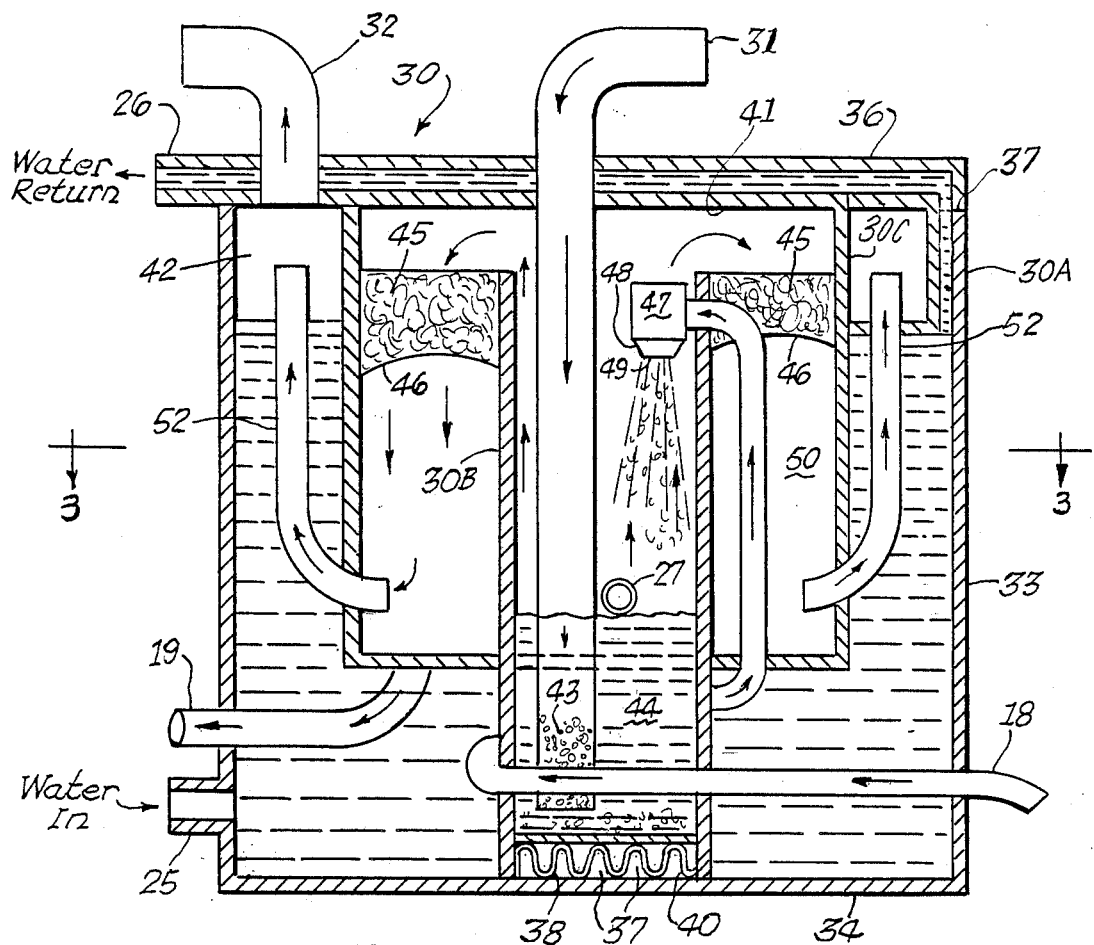
FIG. 2 is an elevation view illustrating the fuel vaporizer unit in cross-section.

Referring now to FIG. 2, there is shown an elevational view in cross-section to illustrate the internal components of fuel vaporizer unit 30. Fuel vaporizer unit 30 comprises a first cylindrical member 30A formed by cylindrical wall 33 with an integral base 34 and cover 36 which is brazed or soldered at 37 circumferentially to cylindrical wall 33. Centrally mounted within first cylindrical member 30A is centrally positioned second cylindrical member 30B. Second cylindrical member 30B is provided with legs 38 that are spaced apart to provide passages 37 to permit flow of hot water therethrough and permit contact with base 40 of second cylindrical member 30B. Legs 38 also provide vertical support for second cylindrical member 30B. Positioned at the level of liquid in second cylindrical member 30B is an overflow port 27 which permits excess fuel in the second cylindrical chamber 30B to flow out into third cylindrical chamber 30C where it can collect and then exit through overflow line 19 back to the fuel tank 10. Concentrically positioned between first cylindrical member 30A and second cylindrical member 30B is third cylindrical member 30C. Third cylindrical member 30C is provided with a closed bottom except for an aperture through which second cylindrical member 30B extends and an aperture for overflow line 19. The aperture through which second cylindrical member 30B extends is brazed or soldered to provide a leak tight joint therearound. The bottom of third cylindrical member 30C is spaced from base 34 of first cylindrical member 30A sufficiently to permit contact of the hot water contained therein with the bottom (unnumbered) of third cylindrical member 30C and the outer surface of second cylindrical member 30b to transfer heat thereto. The top of third cylindrical member 30C is provided with a cover 41 which is a larger diameter than third cylindrical member 30C. The purpose of increasing the diameter of cover 41 is to provide support for donut shaped vapor collecting chamber 42. Donut shaped vapor collecting chamber 42 is brazed or soldered to the cover 41 of third cylindrical member 30C to maintain its proper orientation relative to the other compents. Exhaust gas inlet tube 31 extends through cover 36 of first cylindrical member 30A and also cover 41 of third cylindrical member 30C and extends downwardly to a distance short of the base 40 of second cylindrical member 30B. As shown the lowermost portion of tube 31 is closed at the bottom and is provided with a pluralty of holes 43 approximately one sixteenth of an inch in diameter. The purpose of holes 43 is to permit exhaust gases which are flowing down inlet tube 31 to escape and mix with the raw fuel 44 in second cylindrical member 30B. The uppermost end of second cylindrical member 30B stops short of cover 41 i.e. there is a space between cover 41 and the top of second cylindrical. The radial space between the upper end of second cylindrical member 30B and the upper wall of third cylindrical member 30C is packed with bronze wool 45 which is held in place by screen 46 thereunder.

First cylindrical member 30A is provided with engine hot water inlet 25 and outlet 26 to provide the heat to bring about vaporization. Additionally, an overflow port 27 is operatively positioned in second cylindrical member 30B to draw off excess fuel therein. Interconnecting the lower portion of third cylindrical member 30C with donut shaped vapor collecting chamber 42 are eight vapor pick-ups 52 and a slightly larger diameter tubing 53. Any liquid fuel collecting in donut chamber 42 is returned to the lower portion of third cylindrical member 30C via tube 53. After the fuel vapors have collected in donut shaped vapor collecting chamber 42, they are released through vapor exit fitting 32. In addition to the above described tubing connection of the fuel vaporizer, there is fuel line 18 which protrudes through wall 33 of first cylindrical member 30A and makes approximately a 200° wrap around the exterior of second cylindrical member 30B then rises and enters near the top of second cylindrical member 30B where it is operatively connected to fuel spray head 47. Fuel spray head 47 is provided with an internal converging portion 48 and orifice 49 through which the fuel is released into second cylindrical member 30B which serves as the fuel vapor generating chamber.

Having described the various connections of the fuel vaporizer 30, the operation will now be described. As indicated earlier in the description of FIG. 1, the fuel vaporizer unit 30 is used only after the engine has reached its operating temperature, i.e. approximately 190° F. Assuming the engine is at operating temperature and the switch in the driver's compartment has been set to the "RUN" position thus energizing solenoid fuel selector valve to direct gasoline via line 18 to fuel vaporizer unit 30.

As soon as the engine was started engine coolant water started to flow through inlet 25 and completely filled the internal volume of first cylindrical member 30A except for the various closed compartments and tubing lines within first cylindrical member 30A. As the internal volume of first cylindrical member 30A fills, it eventually reaches engine coolant water outlet 26 and is returned to the engine cooling system. As long as the engine is running there is a continuous flow of engine coolant water into and out of fuel vaporizer unit 30. As the engine coolant water became hotter, all the chambers and tubing lines within the fuel vaporizer unit 30 also became hot due to their contact with the hot water. In order to increase the transfer of heat from the water to the fuel vaporizer unit 30, the entire assembly has been made out of copper and all joints have been brazed or soldered to insure leak-free connections. Fuel flowing in line 18 enters first cylindrical chamber 30A and is directed toward second cylindrical chamber 30B where it comes into contact with the outer surface of second cylindrical member for approximately 200° and then passes upwardly through the bottom of third cylindrical chamber 30C then through the wall of second cylindrical member 30B near its uppermost end. After passing through the upper wall of second cylindrical member 30B, tubing 18 is operatively connected to fuel spray head 47. Fuel spray head 47 is provided with a converging portion 48 and an orifice 49 through which the fuel exits as fine droplets of fuel and then collects in the lower portion of second cylindrical member 30B where the fuel collects while it is being further heated by the hot engine water that surrounds second cylindrical chamber 30B. Positioned at a predetermined height is fuel overflow port 27 which permits excess fuel in chamber 30B to flow out into chamber 30C and returns it via electric pump 21 to fuel tank 10.

In addition to the heat transferred to the fuel from the hot engine coolant water, there is a secondary source of heat. The secondary source of heat is via line 31 which is tapped off PCV valve 22 and delivered through line 23 to exhaust gas inlet tubing 31. As the exhaust gases enter inlet tubing 31 which extends through cover 36 downwardly to a point just above base 40 of second cylindrical member 30B. Lower end of tubing 31 projects well below the surface of the liquid fuel in second cylindrical member 30B and is provided with a plurality of fine apertures 43 approximately one sixteenth on an inch in diameter through which the hot exhaust gases are released. As the hot exhaust gases are released into the fuel in the lower portion of second cylindrical chamber 30B they travel upwardly through the fuel and impart additional heat thereto.

Due to the heat transfer from the hot engine coolant water and the hot exhaust gases, the temperature of the fuel in second cylindrical chamber 30B is raised dramatically and brings about rapid vaporization of the liquid fuel. As the vapors are produced they rise within second cylindrical chamber 30B reach cover 41 of third cylindrical chamber 30C and are redirected downwardly through bronze wool 45 and continue to flow downwardly through the concentric chamber 50 formed by second and third cylindrical members 30B and 30c, respectively. Near the bottom of concentric chamber 50 are inlets 51 for vapor pick-up tubes 52. Although only two tubes 52 are shown in this view, there are, in fact, a total of eight such tubes. The upper end of vapor pick-up tubes 52 are connected to donut shaped vapor collecting chamber 42 and project a slight distance above the bottom of chamber 42. Connected to the upper surface of donut shaped chamber 42 is vapor exit fitting 32 which interconnects with vapor line 24 that leads to carburetor 17. Connected to the bottom of donut shaped chamber 42 is return line 53 which returns any condensate or liquid in chamber 42 back to concentric chamber 50 for subsequent return to fuel tank 10.

Figure 3:
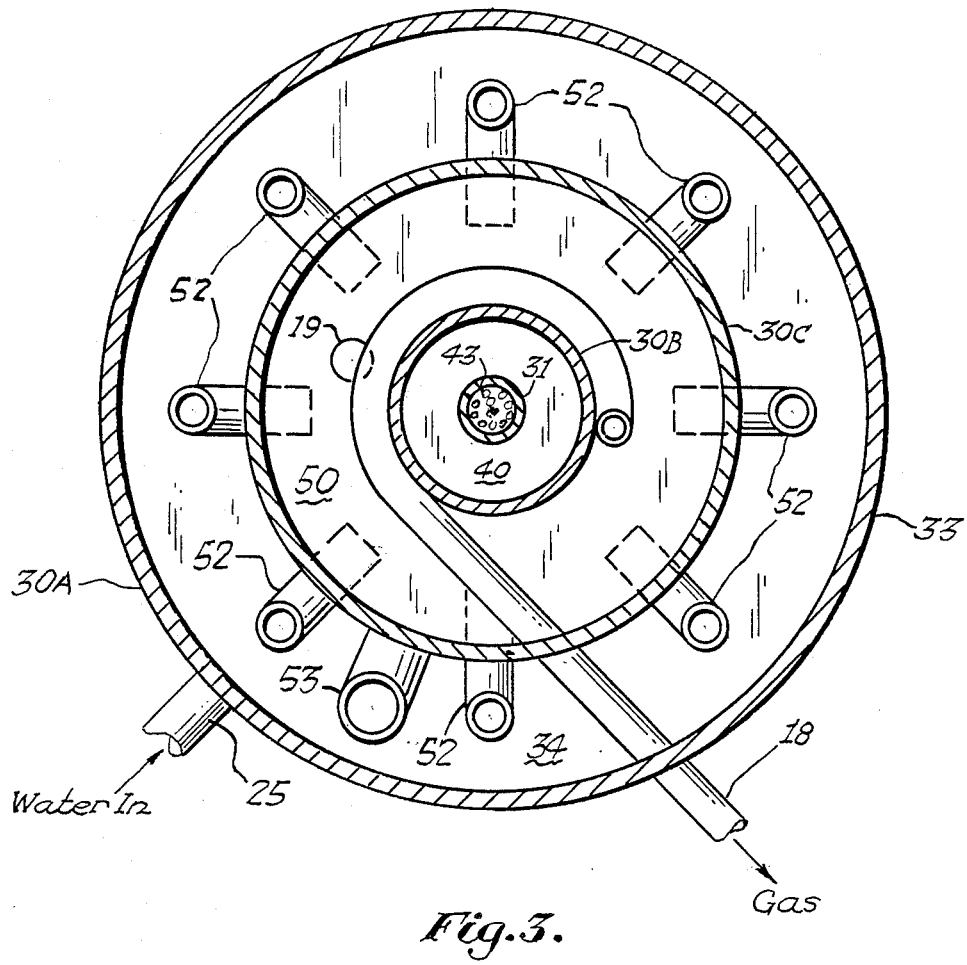
FIG. 3 is a sectional view of the vaporizer unit taken along the line 3—3 of FIG. 2.

Referring now to FIG. 3, which is a sectional view taken along the line 3—3 of FIG. 2, there is a clear showing of the concentric relationship of cylindrical members 30A, 30B and 30C. Additionally, there is an illustration of fuel line 18 and its contact with the outer wall of second cylindrical member 30B. Vapor tubes 52 are also shown as the means for transferring fuel vapors from concentric chamber 50 to donut shaped vapor collecting chamber 42. Also shown is condensate return line 53 which is connected to the donut shaped vapor collecting chamber 42 the same as vapor tubes 52. Line 53 returns any liquid droplets which might collect in vapor collecting chamber 42 to concentric chamber 50 where drain line 19 returns to pump 21 then back to fuel tank 10.

As can be seen from the above description, applicant has provided an effective, yet inexpensive, means of modifying a conventional fuel system through use of the novel fuel vaporizer and appropriate controls. This system can be incorporated at the time of manufacture into new engines or readily added to existing fuel systems and still provide the indicated fuel savings as well as significant reduction of pollutants in the exhaust gases.

While the invention has been described in its preferred embodiment, it is to be understood that words which have been used are words of description rather than limitation and that changes may be made within the purview of the appended claims without departing from the full scope or spirit of the invention.

Having thus described my invention, I claim:

1. A fuel system for an internal combustion engine, comprising:

in combination: fuel supply means connected to a fuel source; selector valve connected to said fuel supply means for directing fuel into one of two possible flow paths; vaporizer means selectively connected to one of said two possible flow paths; carburetor means selectively connected to the other of said two possible flow paths; first and second heating means operatively connected to said vaporizer means for imparing heat to fuel in said vaporizer means and vapor collecting means positioned within said vaporizer means whereby said liquid fuel is converted into vapors and conduit means connecting said vapor collecting means to said carburetor means permits said internal combustion engine to operate on fuel vapors when said selector valve means directs said liquid fuel to said vaporizer means;

wherein said vaporizer means comprises a first cylindrical member sealed at its top and bottom; a second cylindrical member centrally positioned relative to said first cylindrical member and a third cylindrical member concentrically positioned between said first and second cylindrical members; said second cylindrical member being open at its uppermost end and closed at its bottom end, said third cylindrical member being closed at its upper and lower ends, a cylindrical chamber formed between said second and third cylindrical members; said first heating means in fluid contact with each of said first; second and third cylindrical members, fuel spray head means positioned in said second cylindrical member for directing fuel toward the bottom of of said second cylindrical member; said second heating means comprising a downwardly directed tube having a perforated end portion for conducting and releasing exhaust gases into said second cylindrical member below the level of fuel contained therein; said second cylindrical memer forming a first vapor generating chamber for fuel vapors and vapor collecting means in said vaporizer means.

2. A fuel system for an internal combustion engine as defined in claim 1 wherein said first heating means comprises fluid connections for supplying hot engine coolant water to and from said vaporizer means.

3. A fuel system for an internal combustion engine as defined in claim 1 wherein said vapor collecting means comprises a plurality of vapor conducting tubes interconnecting said cylindrical chamber between said second and third cylindrical members with a donut-shaped vapor collecting chamber.

4. A fuel system for an internal combustion engine as defined in claim 1 wherein said second cylindrical member is provided with a plurality of legs with a space between adjacent legs, said legs providing vertical support to said second cylindrical member and said space between adjacent legs permitting hot engine coolant to pass therebetween and transfer heat to the liquid fuel contained in said second cylindrical member.

5. A fuel system for an internal combustion engine as defined in claim 1 wherein said cylindrical chamber receives fuel vapors generated in said second cylindrical member for further distribution to said vapor collecting means.

6. A fuel system for an internal combustion as defined in claim 1 wherein said second cylindrical member is provided with an aperture through the wall thereof, said aperture set at a predetermined height to control the level of liquid fuel in said second cylindrical member.

7. A fuel system for an internal combustion engine as defined in claim 6 wherein said third cylindrical member is provided with a first drain in the bottom thereof, said drain directing collected liquid fuel back to said fuel tank.

8. A fuel system for an internal combustion engine as defined in claim 7 wherein said donut-shaped collecting chamber is provided with a second drain for returning liquid fuel droplets to said cylindrical chamber for return to fuel tank via said first drain leading therefrom.

9. A fuel system for an internal combustion engine as defined in claim 1 wherein bronze wool is positioned between the upper end portion of said second cylindrical member and the inner wall of said third cylindrical member to collect any minute droplets of liquid fuel with said droplets of liquid fuel subsequently falling to the bottom of said second cylindrical chamber.

* * * * *